United States Patent [19]

Vernon et al.

[11] Patent Number: 5,088,024
[45] Date of Patent: Feb. 11, 1992

[54] ROUND-ROBIN PROTOCOL METHOD FOR ARBITRATING ACCESS TO A SHARED BUS ARBITRATION PROVIDING PREFERENCE TO LOWER PRIORITY UNITS AFTER BUS ACCESS BY A HIGHER PRIORITY UNIT

[75] Inventors: Mary K. Vernon, Madison, Wis.; Udi Manber, Tuscon, Ariz.

[73] Assignee: Wisconsin Alumni Research Foundation, Madison, Wis.

[21] Appl. No.: 304,491

[22] Filed: Jan. 31, 1989

[51] Int. Cl.⁵ ............................................. G06F 13/36
[52] U.S. Cl. ........................ 395/725; 364/240.1; 364/242.7; 364/242.92; 364/937.01; 364/DIG. 1; 364/DIG. 2
[58] Field of Search ... 364/200 MS File, 900 MS File; 340/825.5

[56] References Cited

U.S. PATENT DOCUMENTS

| | | | |
|---|---|---|---|
| 497,148 | 11/1890 | Matteson | 364/200 |
| 3,629,854 | 12/1971 | Hauck | 364/200 |
| 3,761,879 | 9/1973 | Brandsma et al. | 364/200 |
| 3,813,651 | 5/1974 | Yamada | 364/200 |
| 4,009,470 | 2/1977 | Danilenko et al. | 364/200 |
| 4,099,233 | 7/1978 | Barbagelata et al. | 364/200 |
| 4,232,294 | 11/1980 | Burke et al. | 364/200 |
| 4,257,095 | 3/1981 | Nadir | 364/200 |
| 4,263,649 | 4/1981 | Lapp, Jr. | 364/200 |
| 4,321,669 | 3/1982 | Macmillan | 364/200 |
| 4,363,094 | 12/1982 | Kaul et al. | 364/200 |
| 4,374,413 | 2/1983 | Comfort et al. | 364/200 |
| 4,374,414 | 2/1983 | Comfort et al. | 364/200 |
| 4,375,639 | 3/1983 | Johnson, Jr. | 340/825.5 |
| 4,385,350 | 4/1983 | Hansen et al. | 364/200 |
| 4,418,386 | 11/1983 | Vrielink | 364/200 |
| 4,419,724 | 12/1983 | Branigin et al. | 364/200 |
| 4,463,445 | 7/1984 | Grimes | 364/900 |
| 4,488,217 | 12/1984 | Binder et al. | 364/200 |
| 4,554,628 | 11/1985 | Bell | 364/200 |
| 4,600,988 | 7/1986 | Tendulkar et al. | 364/200 |
| 4,620,278 | 10/1986 | Ellsworth et al. | 364/200 |
| 4,809,164 | 2/1989 | Fuller | 364/200 |
| 4,908,749 | 3/1990 | Marshall et al. | 364/200 |
| 4,926,419 | 5/1990 | Whipple | 370/85.6 |

FOREIGN PATENT DOCUMENTS 2110847 2/1983 United Kingdom .

OTHER PUBLICATIONS

Gustavson, David B., "Computer Buses—A Tutorial", *IEE Micro*, Aug. 1984.

Vernon and Manber, "Distributed Round-Robin and First-Come First-Serve Protocols and Their Application to Multiprocessor Bus Arbitration", *Computer Sciences Technical Report #745*, Feb. 1988.

*Primary Examiner*—Thomas C. Lee
*Assistant Examiner*—Richard Lee Ellis
*Attorney, Agent, or Firm*—Quarles & Brady

[57] ABSTRACT

A protocol is disclosed for the round-robin distributed arbitration of access to a common resource, such as a bus, in a multiprocessor system or machine. The protocol assigns identity values to each agent, or processor, which are compared during each arbitration to determine which agent is awarded control of the bus. To enhance fairness agents having an identity value lower than the winner of the last arbitration are favored over agents having a higher identity value in the next subsequent arbitration.

5 Claims, 3 Drawing Sheets

ROUND-ROBIN PROTOCOL METHOD FOR ARBITRATING ACCESS TO A SHARED BUS ARBITRATION PROVIDING PREFERENCE TO LOWER PRIORITY UNITS AFTER BUS ACCESS BY A HIGHER PRIORITY UNIT

FIELD OF THE INVENTION

This invention pertains to the field of computer system resource allocation arbitration protocols.

BACKGROUND OF THE INVENTION

As computer systems and networks become increasingly complex and include increasing amounts of distributed or parallel processing, the method by which a system allocates usage of common resources can have a significant effect on the overall capability of a system. Such allocation methods and their supporting hardware define arbitration protocols by which the system arbitrates among agents competing for the same resource. While the problem of arbitration may arise with respect to a variety of system resources, such as processors, storage devices or memory segments, it is best characterized and understood when the resource is a communication channel, typically a communication bus.

Computer buses are used to communicate and transfer data between various parts of a computer or to or from peripheral devices. Buses may be confined to a circuit board, used to communicate from one circuit board to another, or even used to allow different processing units to communicate. This invention is useful in the arbitration of control of buses that accommodate a priority arbiter, such as a parallel contention arbiter of the type described in UK Patent Specification No 1099575, and by Taub D.M. "Arbitration and Control Acquisition in the Propose IEEE 896 Futurebus," *IEEE Micro*, 4:4, pp. 52–62 (1984) One particularly relevant application for such a bus arbiter is for control of buses that are used for communicating between multiple processors located in one or more computing machines.

Buses are electrical conductors, usually copper wire, copper patterns or aluminum patterns. A bus is simply the parallel electrical lines used to carry a designated number of signals with a specified format for data or addresses applied to the bus.

When an agent (a device, e.g. a processor) wishes to communicate with another agent, the first agent sends signals that cause the second agent to respond. These signals are collectively called the address or identity. The device that begins the communication is called the master, and the device that responds is called the slave. Some agents can act only as masters, some only as slaves, and other as either masters or slaves.

It is inherent in a bus that only one agent at a time may use the bus, otherwise indefinite conditions would exist. When two agents attempt to use the bus at the same time, a mechanism or protocol must decide which agent shall be able to use the bus. This mechanism is called arbitration. Details of buses and arbitration schemes may be found in *Computer Buses—A Tutorial* by David B. Gustavson, August 1984, IEEE Micro, p. 7, herein incorporated by reference.

The "star" arbitration scheme uses a central arbiter which is connected to each agent by two dedicated wires. One wire is used to allow the agent to send a request signal to the central arbiter, and the second wire is used to allow the central arbiter to send a bus granted signal to the agent. Thus for N agents, two * N extra wires are needed to arbitrate bus access. The central arbiter can use any of a number of schemes to arbitrate requests for the bus in a fast and efficient manner. However, such special wiring is comparatively expensive.

The so-called daisy chain method is a second arbitration scheme. Under this protocol, all agents share a bus request line and each agent has one daisy-in input line and one daisy-out output line. The daisy-in line receives an input signal from the previous agent, and the daisy-out line is connected to send an output signal to the next adjacent agent. When an agent does not want control of the bus, the signal on the daisy-in input is passed through to the daisy out output. When an agent wants control of the bus it forces a "zero" on the daisy-out output and a "one" on the shared bus request line. The shared bus request line is a wired-OR line that may be actuated by any agent. Any agent wishing to use the bus thus asserts the shared bus request line by asserting a logical "one" on the line. This places a one on the daisy-in input of the highest priority agent. If the first priority agent does not want to use the bus, it passes the one through to its daisy-out output. The signal is passed along in a daisy-chain manner until an agent seeking control of the bus receives a logical one on its daisy-in in-put. If no agent preceding the asserting agent wants the bus, the signal from the shared bus request line will be passed through to the asserting 1 agent, and a bus grant signal will appear on the asserting agent's daisy-in in-put. If a preceding agent desires the bus, the preceding agent will gain control of the bus and will continue placing a zero on its daisy-out output, and all subsequent agents (including the asserting agent) will be inhibited from using the bus. Thus, the closer an agent is to the beginning of the daisy chain, the higher priority the agent has. Also, rules are necessary to prevent a high priority agent from taking the bus away from a low priority agent while it is in use. This may be accomplished by synchronizing request assertions. The daisy chain is economical but slow, and it requires every agent be in place to complete the daisy chain bus grant line. This scheme also does not have much fairness among the agents, since higher priority agents will be able to disproportionately dominate control of the bus.

A third scheme, the parallel contention arbiter as described in the references cited above, is based on assigning each agent a unique fixed k-bit arbitration number called its "identity." The value of k is at least $[\log_2(N+1)]$, where N is the maximum number of agents that can be attached to the bus. An agent that wants control of the bus forces a wired-OR shared bus request line, and waits for a signal to start arbitration. The signal to start arbitration may be generated by the current bus master, a central timing controller, or any agent on the bus. At the start of an arbitration, the agent applies its arbitration number to a separate parallel set of arbitration control lines provided on the bus for this purpose. The agent then monitors each of the arbitration lines, in parallel. If the value carried by line i is "1," but the agent is applying a "0" to it, then the agent removes the lower-order (i−1 to 0) bits of its identity. If line i drops back to "0," the agent reapplies the lower-order bits it removed before. For example, consider the case where two agents with identities 1010101 and 0011100, respectively, are requesting the bus. The first agent will remove its three lowest order bits, leaving 1010000, and the second agent will remove all of its bits.

Next, the first agent will reapply its three lowest order bits, and the second agent will do nothing, since the most significant bit still remains. It is easy to see that after some period of time the system reaches steady state, in which the lines carry the largest identity of all competing agents. The agent whose arbitration number matches the winning number becomes the next bus master. Note that at the end of the arbitration, each agent knows the identity of the winner, as well as whether it has won or lost. The parallel contention arbiter thus described is a priority arbiter that is very fast but is also inherently unfair, since an agent with a higher identity will always win an arbitration against an agent with a lower identity, and thus higher priority agents will disproportionately control the bus.

The parallel contention arbiter, due to its low cost and high speed, has been adopted in several multiprocessor system bus designs. To overcome the unfairness inherent in the basic priority selection mechanism, assured access protocols have been designed to provide a set of agents (i.e. the processors) with equal access to the bus. These protocols are based on batching requests, such that all requests in a batch are served before any new requests can be made. In particular, requests in the batch from agents with low assigned identities will receive service before new requests can be made by agents with high assigned identities.

In one protocol, all requests that arrive to an idle bus assert the bus request line and form a batch. An agent in the batch competes during each arbitration until it has been granted ownership of the bus. An agent that generates a new request while a batch is in progress must wait for the batch to end before asserting the request line and competing for access. The end of the batch is generally signalled by a logical "0" on the request line, since each agent in the batch releases the request line at the start of its bus tenure. All requests that are waiting at the end of a batch assert the shared request line and form a new batch. Agents in a batch receive service in order of their assigned identities, according to the parallel contention arbitration.

In a second assured access protocol, an agent with a request asserts the request line and competes in successive arbitrations until acquiring the bus. At the completion of its bus tenure, the agent marks itself as "inhibited," and won't assert the request line or compete for bus ownership until a fairness release operation takes place. The fairness release operation is a cycle in which no agents assert the request line. In other words, either there are no outstanding requests, or all agents with outstanding requests are inhibited.

The second protocol implements a batching algorithm similar to the first protocol. A batch starts and ends with a fairness release cycle. No agent is bus master more than once in a batch, but an agent with a request that is generated during a batch is allowed to join the batch if the agent has not previously received service in the batch.

There is a source of unfairness even in the above assured access protocols. In every batch, an agent receives service after all agents in the batch that have higher identities have received service. For example, in multiprocessor systems in which the processors do not continue executing while waiting for a memory request to be satisfied, this means that the lower-identity processors execute at a slower rate. The difference in throughput between the most favorably treated agent (i.e. the agent with the highest assigned identity) and the least favorably treated agent may be 10%, and can be as high as 100% for each of the protocols described above. Tightly coupled parallel algorithms are often sensitive to the speed of the slowest processor. In this case, the unfairness can affect total system performance.

Priority scheduling of urgent requests may be integrated with the assured access protocols in the parallel contention arbiter. In this case, agents follow the assured access protocol for non-priority requests, but ignore the protocol and compete in every arbitration for priority requests. Furthermore, an extra line can be provided on the bus, to be treated as the most significant bit of the agent's identity. Agents with priority requests assert this line during arbitration; agents with non-priority requests do not. This guarantees that all priority requests will be served before non-priority requests.

Prior art arbitration protocols have not been able to economically insure fairness. The star arbitration method may be fair, but it also may be expensive. The assured access protocols for the parallel contention arbiter are relatively inexpensive, but are unfair. The present invention successfully implements a fair arbitration protocol for priority arbiters. When used in a parallel contention arbiter, fairness can be inexpensively achieved.

SUMMARY OF THE INVENTION

The present invention is a round robin arbitration protocol to arbitrate competing demands for a computer system resource. Each agent which might compete for the resource has assigned to it a fixed identity value. Under the protocol, an arbitration is conducted among all agents seeking to control the resource and the control of the resource is awarded to the agent with the greatest identity value. Each agent then stores the identity value of the winning agent. Then, during the next arbitration, each agent having an identity value less than the agent winning the last arbitration is preferred over each agent having an identity value greater than the agent winning the last arbitration.

This method of arbitration may be used for any shared resource in a computer system but will find its first utility in computer systems in which multiple agents, typically processors, compete for control of a common bus.

There are at least three methods to implement these general rules. In a first method, each agent's binary identity includes an extra round robin bit having a greater significance than the unique static portion. Any agent having a unique static identity less than the previous winner's identity, disregarding the extra bit, sets its round robin bit to "one." All other agents set their bit to "zero." The second method requires an extra broadcast signal which may be called the "low request line." Any agent having an identity less than the previous winner's and desiring control of the bus asserts the low request line. If the low request is asserted only agents with an identity less than the previous winner's compete in the arbitration.

The third method implements rules (1) and (2) sequentially. That is, only agents having an identity less than the previous winner's compete in an arbitration. If no agents compete in an arbitration a number greater than the greatest identity is recorded as the winning identity, and a new arbitration is started.

The prior art assured access protocols has differences in throughput of approximately 10% at heavy workloads, and 100% at extremely saturated workloads, between the highest and lowest identity agents. The present invention has no difference in throughput (i.e. no preferential treatments) for all workloads. This increased fairness without increased expense increases the system performance.

DESCRIPTION OF THE PREFERRED EMBODIMENTS

Figure 1:
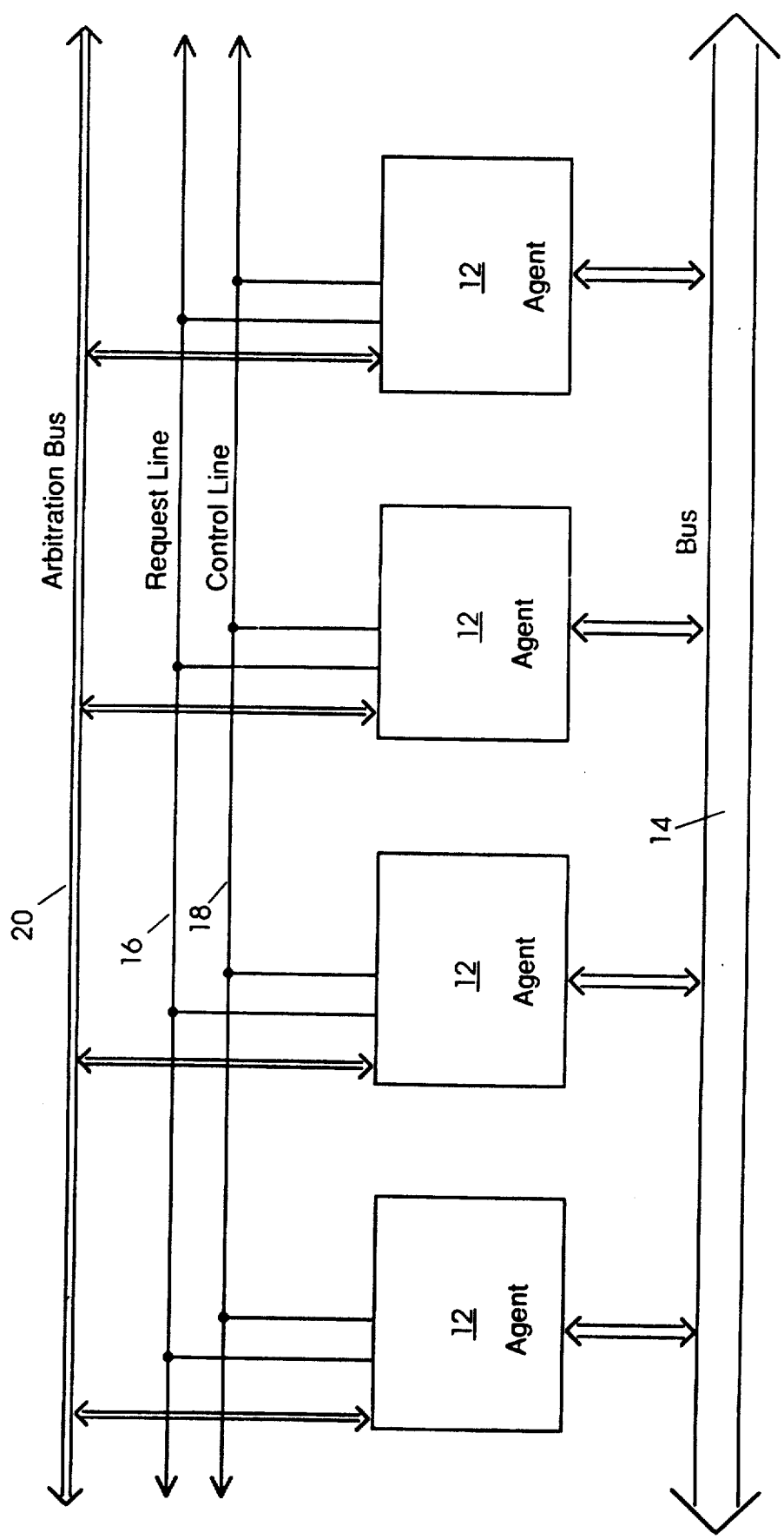
FIG. 1 shows portions of a bus having a plurality of agents on which the method of the present invention may be implemented.
Figure 2:
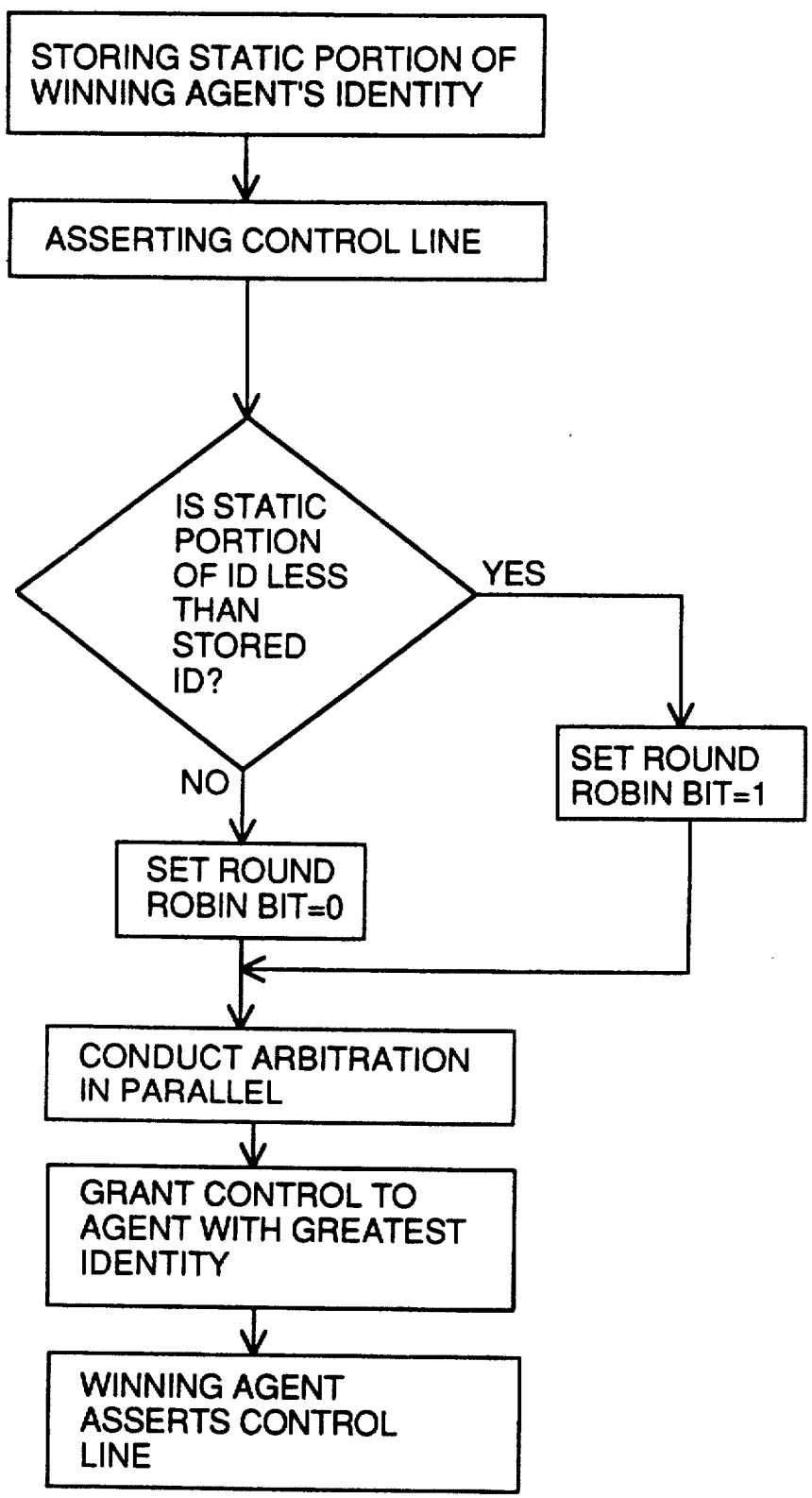
FIG. 2 is a flowchart of a protocol operating in accordance with the present invention.
Figure 3:
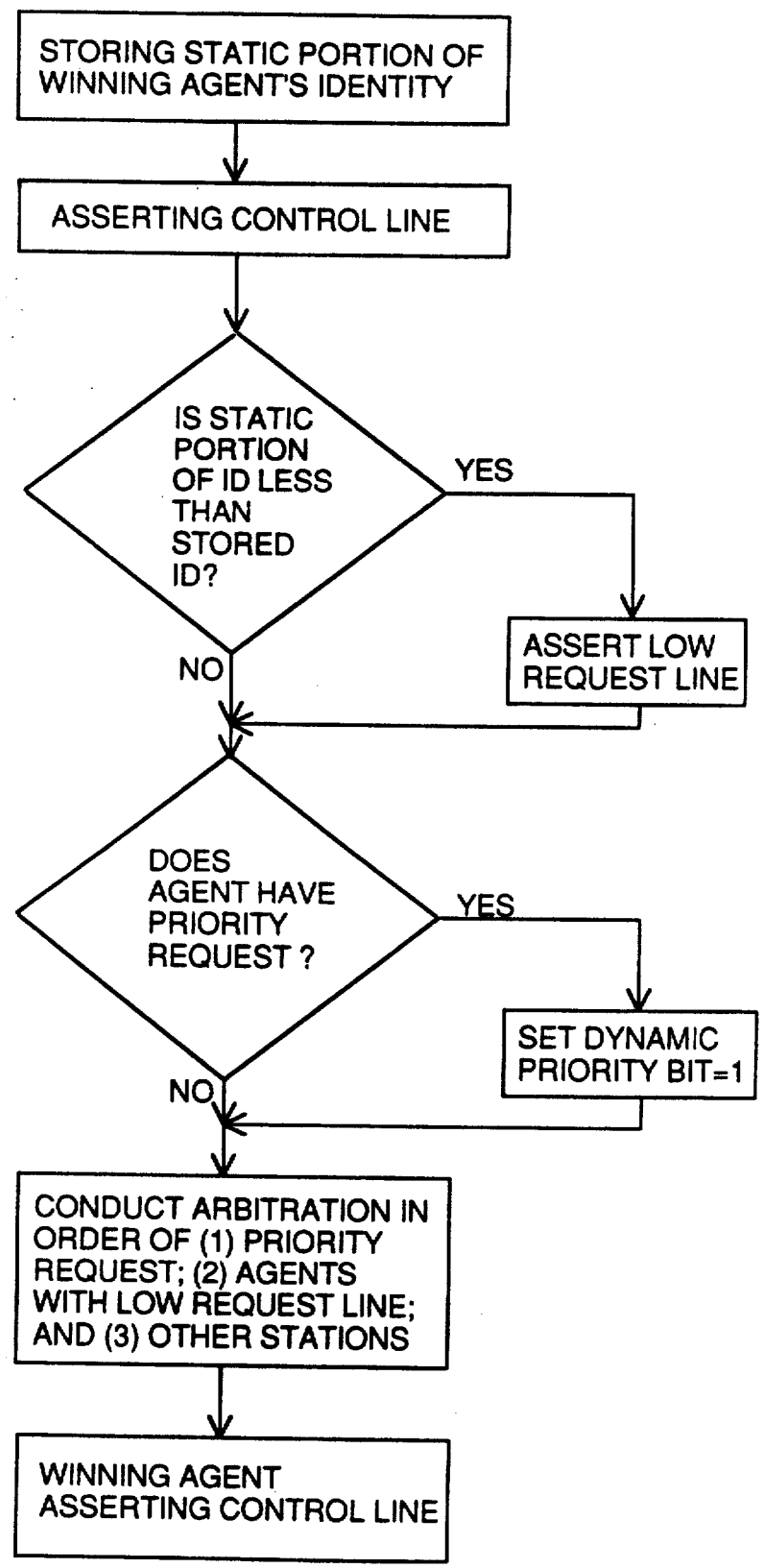
FIG. 3 is a flowchart of another protocol operating in accordance with the present invention.

The arbitration protocol of the present invention may be characterized as a distributed round-robin protocol that is an extension or improvement of priority arbiters such as the parallel contention arbiter described above. As in a parallel contention arbitration scheme, there are a series of agents 12 competing for a resource such as a bus 14. A shared wired-OR bus request line 16 is connected to each agent 12 as well as control lines 18 for starting an arbitration. A parallel arbitration bus 20 of $k \geq \lceil \log_2(N+1) \rceil$ is required for N agents, and the agents 12 are also connected in wired-OR logic to the arbitration bus 20. This arbitration protocol makes use of fixed assigned identity values for each agent. The initial arbitration is similar to the parallel contention arbiter described above. After one arbitration, however, the present protocol proceeds somewhat differently. If the first arbitration is won by agent with identity j, then in the next arbitration all agents with assigned identity values less than j, i.e. 1 through j−1, will be given priority over all agents having assigned identity values greater than or equal to, i.e. j through N. This protocol is based on a finding that if the fixed priority protocol is altered to permit the granting of special status, for one arbitration, of agents which have lower assigned values than the winner of the prior arbitration, then the overall distribution of bus access among the agents becomes perfectly fair.

There are several possible embodiments of this concept. Three will be described here. All these three require that the identity of the agent winning an arbitration be available to each of the other agents.

The first, and probably simplest embodiment of the round-robin protocol requires an extra bit of shared information, that is one extra bit on the parallel arbitration bus 20. This bit is called the round-robin bit. The round-robin bit is treated as the most significant bit of each agent's identity. Each agent records the identity of the winning agent, i.e. the agent that gained control of the bus, at the end of every arbitration, excluding the round-robin priority bit. Thus only the unique static portion of the identity for the winning station is recorded. An agent asserts the shared bus request line and competes in the next arbitration whenever it desires control of the bus. When an agent competes in an arbitration, the agent sets its round-robin bit for its identity to "one" if its static identity value is less than the recorded static identity value of the winner of the previous arbitration. The logic needed to implement this protocol primarily consists of a register in each agent to store the winning identity, and a comparator in each agent to determine if the agent's assigned arbitration number is less than the recorded value. Alternatively, a comparator and one bit of storage for the result may be used. The output of the comparator is used as the round-robin bit of the agent's arbitration number. Note that this logic replaces the logic required to implement the assured access protocols of prior art parallel contention arbiters.

The second implementation of the round-robin protocol also requires an extra bit of shared information. This may be implemented by an extra bit on parallel arbitration bus 20 or as a part of the control bus 18. In this embodiment the extra bit is called the low-request line. Any agent that wants control of the bus asserts the shared bus request line as usual. In addition, an agent requesting control of the bus asserts the low-request line if its identity value is less than the recorded identity value of the most recent winner of an arbitration. An arbitration is only started if the bus request line is asserted. If low-request is also asserted at the start of an arbitration, only agents with identities less than the winner of the previous arbitration compete in the arbitration. Thus each agent with an identity value higher than or equal to the static identity value of the last winner must be strapped by internal logic not to compete if the low-request line is forced. The agent with the greatest identity among this group of competitors becomes the next bus master, and releases the shared request line at the start of its bus tenure. The logic require for the second implementation is similar to the logic for the first implementation. Each agent requires a register to record the winning identity at the end of each arbitration, and a comparator to determine if its static identity is less than the recorded identity.

The third implementation of the round-robin protocol is somewhat less efficient than the first two implementations, but does not require the extra line on the bus. As in the first two implementations, an agent asserts the shared bus request line whenever it wants control of the bus, and each agent records the identity value of the winning agent at the end of every arbitration. As usual, an arbitration is started when the shared bus request line is asserted. Under this variant, only agents with assigned identity values less than the recorded identity value of the previous winner may compete in an arbitration. No agent is permitted to have an zero indicates that no agent participated in the arbitration. When the winning identity is zero, a fixed value greater than N (where N is the maximum identity value of the agents) is recorded as the winning value and a new arbitration is started immediately. Note that all agents may compete in the second arbitration since all have an identity value less than the fixed value.

The above protocols implement non-preemptive distributive round-robin scheduling, each with approximately the same complexity. The round-robin scan is conceptually implemented in two parts. The first part scans all agents with identities lower than the previous winner, and the second part scans all agents with higher identities. For embodiments one and two, the two conceptual parts of this process occur within the same arbitration. Priority scheduling of urgent requests is easily integrated with round-robin scheduling of non-priority requests in any of the implementations of the round-robin protocol. The first embodiment has the further advantage that round-robin scheduling can be easily implemented within a priority class, if desired. Mechanisms for round-robin scheduling of priority request are more complex in the other two implementations.

The integration of priority service in the first embodiment of the round-robin protocol can work as follows. Each agent's identity consists of two dynamic bits and k lesser significant static bits. Thus k+2 lines are required in the parallel arbitration bus 20. The round-robin bit is the second most significant bit; the most significant bit is used for priority requests, and the remaining k lesser significant bits carry the agent's unique static identity. All agents compete in each arbitration by setting the priority bit to "one" for a priority request, an agent circumvents the round robin order and gains control of the bus immediately. If more than one agent has a priority request, the agents follow the protocol to implement round-robin scheduling within the priority class.

In the second and third methods any agent having a priority request sets its priority bit to one. Any agent having a priority request competes in the arbitration. When there is more than one priority request, the round-robin protocol may be followed for the priority class, or the agent with the greatest identity and a priority request may gain control.

This system implements round-robin parallel arbitration in a distributed and efficient fashion. The system maintains the static identity value assignments used in parallel contention arbiters and is thus likely to be equally fault-tolerant and robust. A failure at an agent as to the storage of an identity value or comparator leads, at worst, to minor unfairness because the agent competes in an arbitration when it should not. The required processing overhead is not significantly greater than that required for prior systems, in spite of the greater fairness achieved.

Computer simulation experiments have been conducted to attempt to evaluate this protocol for efficiency and fairness. At low bus bandwidths (i.e. few agent requests) bus bandwidth was allocated fairly in proportion to agent request rates. At higher levels of bus utilization, this protocol maintained even allocation of the bus bandwidth regardless of variations in the agent's relative request rate for the bus.

While the invention has been particularly shown and described with reference to the preferred embodiment thereof, it will be understood by those skilled in the art that various changes in form and details may be made without departing from the spirit and scope of the invention.

What is claimed is:

1. A method of arbitrating among a plurality of agents competing for control of a common bus used by the agents; each agent having an identity having a unique static portion and a dynamic portion having a round robin bit more significant than the most significant bit in the static portion, and each agent having a register capable of storing the static portion of an agent's identity; the bus being comprised of a plurality of data wires, a plurality of arbitration lines, and a control wire; comprising the steps of:
   (a) storing the static portion of the identity of the winning agent of each arbitration in each of the agent's register at the end of each arbitration;
   (b) any agent asserting the control line when it wants control of the bus;
   (c) each agent asserting the control line setting its round robin bit equal to one when the static portion of the asserting agent's identity is less than the identity stored in the asserting agent's register;
   d) each agent asserting the control line setting its round robin bit equal to zero when the static portion of the asserting agents identity is greater than or equal to the identity stored in the asserting agents register;
   (e) all agents presenting their identity on the arbitration lines during arbitration of the requests for control of the bus;
   (f) granting control of the bus to the agent with the greatest identity that is asserting the control line; and
   (g) the winning agent stopping asserting the control line when it gains control of the bus.

2. The method of claim 1 wherein the dynamic portion of each agent's identity further includes a priority bit having a greater significance than the round robin bit; further including the steps of:
   (a) an agent that asserts the control line, and has a priority request for control of the bus, sets the dynamic priority bit of its identity equal to one;
   (b) an agent that asserts the control line and does not have a priority request, sets the dynamic priority bit of its binary identity equal to zero.

3. A method of arbitrating among a plurality of agents competing for control of a bus used by the agents to communicate with other agents; wherein each agent has a binary identity having a unique static portion, and each agent has a register capable of storing the static portion of an agent's identity; and wherein the bus is comprised of a plurality of data lines, a plurality of arbitration lines, a control line, and a low request line; comprising the steps of:
   (a) storing the static portion of the identity of the winning agent in each agent's register at the end of every arbitration;
   (b) each agent asserting the control line when it wants control of the bus;
   (c) each agent that asserts the control line also asserting the low request line only if the static portion of the asserting agent's binary identity is less than the binary identity stored in the asserting agent's register;
   (d) if the low request line is asserted, granting control of the bus to the agent that has the greatest binary identity and is asserting the low request line;
   (e) if the low request line is not asserted, granting control of the bus to the agent that has the greatest binary identity and is asserting the control line; and
   (f) the winning agent stopping asserting the control line and the low request line when it gains control of the bus.

4. A method of arbitrating among a plurality of agents competing for control of a common bus used by the agents; wherein each agent has a binary identity having a unique static portion and a dynamic priority bit more significant than the most significant bit in the static portion, and each agent has a register capable of storing the static portion of an agent's identity; and wherein the bus is comprised of a plurality of data lines, a plurality of arbitration lines, a control line, and a low request line; comprising the steps of:
   (a) storing the static portion of the identity of the winning agent in each agent's register at the end of every arbitration;
   (b) each agent asserting the control line when it wants control of the bus;
   (c) each agent that asserts the control line also asserting the low request line when the static portion of the asserting agent's binary identity is less than the binary identity stored in the asserting agents register;

(d) each agent that asserts the control line and has a priority request for control of the bus, setting the dynamic priority bit of its binary identity equal to one;

(e) each agent that asserts the control line and does not have a priority request, setting the dynamic priority bit of its binary identity equal to zero;

(f) when any agent has a priority request, granting control of the bus to the agent with the greatest binary identity that is asserting the control line;

(g) when no agent has a priority request and the low request line is asserted, granting control of the bus to the agent that has the greatest binary identity that is asserting the low request line and is asserting the control line;

(h) when no agent has a priority request and the low request line is not asserted, granting control of the bus to the agent with the greatest binary identity that is asserting the control line; and (i) an agent stopping asserting the control line and the low request line when it gains control of the bus.

5. A method of arbitrating among a plurality of agents competing for control of a common bus used by the agents; wherein each agent has a binary identity having a unique static portion and a dynamic priority bit more significant than the most significant bit in the static portion, and each agent has a register capable of storing the static portion of an agent's identity: and wherein the bus is comprised of a plurality of data lines, a plurality of arbitration lines, a control line, and a low request line; comprising the steps of (a) storing the static portion of the identity of the winning agent in each agent's register at the end of every arbitration;

(b) an agent asserting the control line when it wants control of the bus;

(c) an agent asserting the control line also asserting the low request line when the static portion of the asserting agent's binary identity is less than the binary identity stored in the asserting agent's register;

(d) an agent asserting the control line and having a priority request for control of the bus also setting the dynamic priority bit of its binary identity equal to one;

(e) an agent asserting the control line and not having a priority request setting the dynamic priority bit of its binary identity equal to zero;

(f) when any agent has a priority request and an agent with a priority request asserts the low request line, the agent with the greatest binary identity asserting the low request line and asserting the control line gaining control of the bus;

(g) when any agent has a priority request and no agent with a priority request asserts the low request line, the agent with the greatest binary identity that is asserting the control line gaining control of the bus;

(h) when no agent has a priority request and the low request line is asserted, the agent that has the greatest binary identity asserting the low request line and asserting the control line gaining control of the bus;

(i) when no agent has a priority request and the low request line is not asserted, the agent with the greatest binary identity asserting the control line gaining control of the bus; and (j) an agent stopping asserting the control line and the low request line when it gains control of the bus.

* * * * *

UNITED STATES PATENT AND TRADEMARK OFFICE
CERTIFICATE OF CORRECTION

PATENT NO. : 5,088,024
DATED : February 11, 1992
INVENTOR(S) : Mary K. Vernon and Udi Manber It is certified that error appears in the above-identified patent and that said Letters Patent is hereby corrected as shown below:

Column 1, line 7, the following text should appear:

--STATEMENT REGARDING FEDERALLY SPONSORED RESEARCH

This invention was made with United States Government support awarded by the National Science Foundation (NSF), PYI Grant No. DCR-8451405. The United States Government has certain rights in this invention. --

Signed and Sealed this

Twenty-ninth Day of March, 1994

Attest:

BRUCE LEHMAN

Attesting Officer     Commissioner of Patents and Trademarks